3,454,350
METHOD OF DYEING POLYPROPYLENE
James Anthony Melchore, Middlesex, N.J., assignor to American Cyanamid Company, Stamford, Conn., a corporation of Maine
No Drawing. Filed June 9, 1966, Ser. No. 556,289
Int. Cl. D06p 1/02; C09b 45/32
U.S. Cl. 8—42    7 Claims

ABSTRACT OF THE DISCLOSURE

When polypropylene is treated with certain nickel-amine complexes of thiobisphenols it is capable of being dyed with metalizable azo and anthraquinone dyes with great facility and the dyed polypropylene exhibits excellent color strength and light fastness.

The present invention relates to an improved process for dying polypropylene articles. It relates further to the provision of dyed polypropylene articles, especially dyed polypropylene fibers. While the present invention will be hereinafter described with particular reference to polypropylene fibers, it will be understood that it is equally applicable to polypropylene whether in the form of a film, a sheet, or a molded article.

Polypropylene fibers have a wide array of very desirable properties which make them useful for both indoor and outdoor use in a variety of ways. One of the difficulties encountered in manufacturing articles from polypropylene is in the dyeing thereof. In general, the untreated material has very little affinity for ordinarily used dyestuffs. Thus, polypropylene cannot be attractively dyed by practicing normal dyeing techniques on the fiber of the unmodified polymer per se.

Attempts have been made to solve this problem and these attempts have met with varying degrees of success. One such previous attempt involves treating the polypropylene with a nickel salt to impart dye sites to the polymeric material. While this treatment of the polypropylene improves its dyeability, it leaves much to be desired since the treated fiber does not dye easily and the color intensity is not very high, perhaps due to the limited affinity of the dyestuff for the treated fiber.

It is an object of the present invention to provide a method by which polypropylene, especially polypropylene fibers, can be dyed with conventional dyestuffs to produce colored polypropylene and particularly dyed polypropylene with increased color strength. It is a further object of the present invention to provide a process for applying dyesuffs to polypropylene fibers whereby the dyeing proceeds with greater facility and to a greater extent than was heretofore achievable. It is a further object of this invention to provide dyed polypropylene having greater light-fastness than hitherto attainable. Other objects will be apparent from a reading of the ensuing description of the present invention.

The present invention is based upon the discovery that when polypropylene is treated with certain nickel amine complexes of thiobisphenols, the polypropylene is capable of being dyed with certain types of dyes with great facility and is found to have very high affinity for metalizable dyestuffs.

The nickel amine complexes which can be used to treat polypropylene preparatory to its dyeing are represented by the following formula:

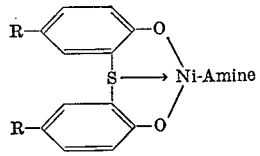

wherein R represents hydrogen or an alkyl radical of 1 to 18 carbon atoms and wherein "Amine" represents ammonia; primary aliphatic amines such as methylamine, ethylamine, propylamine, butylamine, amylamine, octylamine, laurylamine or octadecylamine; primary aromatic amines such as aniline, anisidine, toluidine, 1-naphthylamine, 2-naphthylamine, p-dodecylaniline, p-butylaniline, xylidene or p-octyloxyaniline; or cyclic secondary amines such as morpholine, hexamethyleneimine, piperazine, piperidine; or diamines such as ethylene diamine.

To practice the present invention, polypropylene must be treated with a nickel complex of Formula I preparatory to the dyeing thereof. Methods for incorporating the nickel complexes into polypropylene follow conventional lines. In general, the most common method for incorporation of the nickel complex involves blending the nickel complex with particulate polypropylene until a well-blended mixture is obtained and then milling the mixture on heated rolls until a homogeneous mass is produced. The milled material can then be compression-molded into films or sheets or extruded by conventional means into polypropylene fibers.

In general, about 0.1 to about 5% of the nickel amine complex of Formula I may be incorporated into the polypropylene to obtain the desired level of dyeing. Within this broad range, concentrations between 0.25 and 2.0% are preferred for reasons of effectiveness and economy.

To apply the dyestuff to the nickel-containing fiber, conventional disperse dyeing methods can be used. In such methods, a dyestuff which is metalizable or capable of chelating metals is dissolved in a small amount of organic solvent and the solution is dispersed in water by means of a dispersing agent. The resulting dispersion is used as the dyebath. Polypropylene is immersed therein and the bath is heated to the boil for a period sufficient to permit transfer of the dye from the dispersion to the polypropylene. Normally, this is accomplished in a period of about one to two hours. Suitable dispersing agents for use in the present invention are exemplified by sodium dodecyl sulfate, alkyl aryl sulfonates such as sodium alkyl nathpthalene sulfonates, sodium salts of sulfated fatty esters, dialkyl ester of sulfosuccinic acid, dialkyl ester of sodium sulfosuccinic acid, N-octadecyl disodium sulfosuccinamate, sulfated fatty amines, sodium tetrahydronaphthalene sulfonates, amine alkyl benzene sulfonates, sulfonated fatty acid amides, triethanolamine salts of alkyl sulfates, etc.

The dyed polypropylene obtained by the foregoing dyeing procedure will be found to be of a stronger color shade than could be obtained using the same dyebath but other types of polypropylene containing no nickel component. Moreover, the dye on the polypropylene will be less adversely affected by light, i.e., has greater light-fastness, than other dyed polypropylene compositions.

Dyes which may be applied in accordance with the present invention must be metalizable or capable of chelating metals and, additionally, must be free of water-solubilizing groups. Among such dyestuffs are azo dyes containing a hydroxy, carboxy, or primary amino group in a position ortho to the azo linkage, further characterized by the absence of water-solubilizing groups such as sulfo groups, non-metalizable carboxy groups and non-metalizable sulfamyl groups. Examples of dyestuffs of this type are azo derivatives derived from aromatic amines coupled into various phenolic coupling components such as 8-hydroxyquinoline, beta-napthol, para-cresol, etc. Examples of specific types are represented by the following structures:

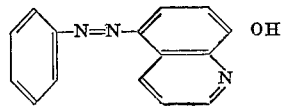

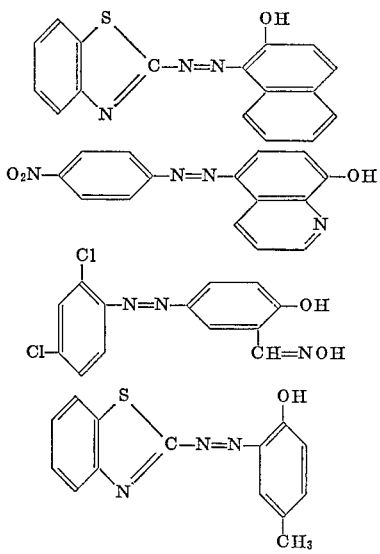

Non-azo dyestuffs can also be used, provided they are free of water-solubilizing groups and contain groups which are metalizable or capable of chelating metals. Representative of such dyestuffs are those of the hydroxyanthraquinone class represented by the following:

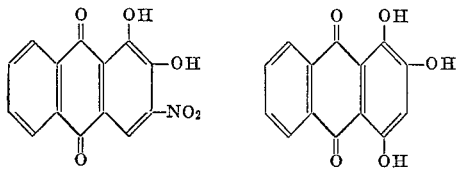

The present invention is further illustrated by the following examples.

Example 1

(A) Fifty grams of polypropylene powder were placed in a screw-top jar along with 0.5 g. of nickel n-butylamine complex of 2,2'-thiobis(p-t-octylphenol). The blend was tumbled for two hours. This mixture was placed on a 6″ x 13″ mill whose rolls were heated to 360° F. and 320° F., respectively. This blend was passed through the nip of the rolls, stripped from the rolls and fed endwise into the nip to insure maximum mixing. This operation of stripping and passing through the nip was repeated ten times. From the sheet resulting from this blend, an 18-mil sheet was compression-molded.

(B) Dyeing with azo dye of the formula:

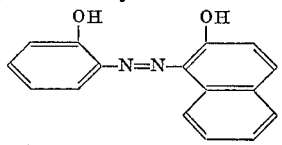

A 6 mg. portion of the above dye was dissolved in about 5 ml. of acetone. 2 ml. of a dispersing agent (5% sodium dodecyl sulfate) were added and the mixture was then diluted to a total of about 200 ml. with distilled water. A small piece of polypropylene film prepared as in Part A was immersed in this bath and dyed one hour at the boil. A similar dyeing was carried out on a piece of polypropylene film identical to the first except that it contained no nickel amine complex.

The polypropylene sample containing the nickel amine complex showed superior affinity for the dye in that much more color was picked up. Both dyed polypropylene film samples were boiled in neutral soap solution and then thoroughly rinsed. The polypropylene containing the nickel complex additive was dyed a much deeper shade than the film with no additive.

Example 2

A number of dyes were applied to polypropylene fabric containing 0.5% of the nickel complex used in Example 1 (0.05% Ni in the fiber). The same dye was also applied using the same method to polypropylene fabric containing no nickel complex. In each instance the dyeing on the fabric containing the nickel complex was much deeper in shade than the dyeing on the fabric with no nickel complex. In addition, the dyeings on the fabric containing the nickel complex were fast to dry cleaning processes.

The dyeing procedure used may be described as follows:

A 12.5 mg. portion of the dye is dissolved in 1 to 10 ml. acetone. To this is added 1 ml. of a dispersing agent (5% sodium dodecyl sulfate) and the whole is then totaled to 200 ml. with water. To this bath is then added a small amount of acid (2% acetic, 2% formic or 1% sulfuric on the weight of the fabric). A 5 g. piece of woven polypropylene fabric is then dyed in the bath one hour at about 200° F. (may vary from 180 to 212° F.). The fabric is removed, rinsed, boiled in 0.1% neutral soap solution for five minutes and again rinsed.

The dyes applied with the resulting colors, all of which were deeper in shade and more fast to dry cleaning than on the polypropylene containing no nickel complex, are shown in the following table:

| Dye | Color |
|---|---|
| (structure: 2-hydroxyphenyl-N=N-2-hydroxynaphthyl) | Brown. |
| (structure: 4-chloro-2-hydroxyphenyl-N=N-2-hydroxynaphthyl) | Red-brown. |
| (structure: O₂N-[HO,Cl,Cl-phenyl]-N=N-phenyl-N(C₂H₅)(CH₂CH₂NH₂)) | Orange. |
| (structure: O₂N-phenyl-N=N-phenyl-N(C₂H₅)(CH₂CH₂NH₂)) | Yellow. |
| (structure: O₂N-phenyl-O-phenyl-N=N-phenyl-N(C₂H₅)(CH₂CH₂NH₂)) | |

Example 3

Using the dyeing procedure described in Example 1B, dyes represented by the formulae shown in the table below were applied to polypropylene fabrics using polypropylene containing 1% of nickel n-butylamine complex of 2,2'-thiobis-(p-t-octylphenol) and polypropylene containing a like amount of nickel acetate.

The dyed polypropylene was then exposed to ultraviolet light in a Fade-O-meter and the number of hours to break or fading was observed. The results are shown in the following Table. It is noted that with polypropylene containing the nickel complex used in accordance with this invention, substantially improved light-fastness is obtained, and in addition, the dye strength on the polypropylene with the nickel amine complex was improved over that with nickel acetate.

2. The method of claim 1 wherein the dye is an azo dye having metalizable groups positioned ortho to the azo linkage, said azo dye being free of water-solubilizing groups.

3. The method of claim 1 wherein the dye is:

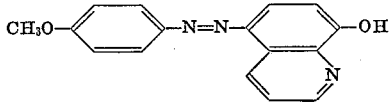

4. The method of claim 1 wherein the dye is:

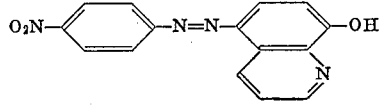

TABLE II

| Dye | Color | Light-Fastness (hours to color break) | | Strength, percent | |
|---|---|---|---|---|---|
| | | Ni amine Complex | Ni acetate | Ni amine complex | Ni acetate |
| CH₃O—⟨ ⟩—N=N—⟨ ⟩—OH (with N ring) | Golden yellow | 40 | 20-40 | 100 | 100 |
| O₂N—⟨ ⟩—N=N—⟨ ⟩—OH (with N ring) | Brown | 80 | <20 | 100 | 80 |
| O₂N—C(N)=C(S)—N=N—⟨ ⟩(OH)(OH) | Blue green | 80 | 40-80 | 100 | 50 |

I claim:

1. In the method of preparing dyed polypropylene wherein the polypropylene is dyed from a dyebath containing a preformed metalizable water-insoluble dyestuff, selected from (a) azo dyes formed by coupling a phenolic compound, selected from the group consisting of hydroxybenzenes, hydroxynaphthalenes and hydroxyquinolines, with a diazotized arylamine and (b) anthraquinone dyes, the improvement which comprises introducing into and dispersing throughout the polypropylene to be dyed, prior to the dyeing process, a preformed nickel amine complex of the following formula:

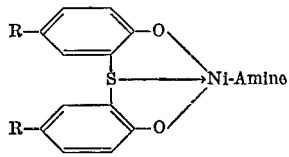

wherein R represents hydrogen or an alkyl radical of 1 to 18 carbon atoms and wherein "Amine" represents a member selected from primary aromatic amines and cyclic secondary amines; said nickel amine complex being present in the polypropylene in a concentration of about 0.1% to 5% based on the weight of the polypropylene.

5. The method of claim 1 wherein the dye is:

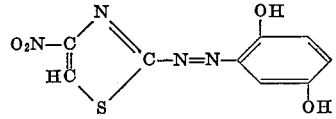

6. The dyed polypropylene produced by the method of claim 1.

7. The method of claim 1 wherein the dye is

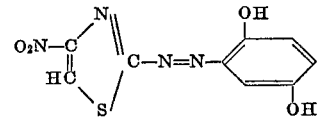

and the "Amine" in the nickel amine complex is p-octyloxyaniline.

References Cited

UNITED STATES PATENTS 3,332,732   7/1967   Karoly _____ 8—42

DONALD LEVY, *Primary Examiner.*